United States Patent [19]

Shalom et al.

[11] Patent Number: 4,985,913

[45] Date of Patent: Jan. 15, 1991

[54] MULTIPLE MESSAGE ANSWERING MACHINE KEYED TO THE INCOMING PHONE NUMBER

[75] Inventors: Stephen R. Shalom, 135 Haddon Pl., Montclair, N.J. 07043; David A. Cane, Sudbery, Mass.

[73] Assignee: Stephen R. Shalom, Montclair, N.J.

[21] Appl. No.: 399,984

[22] Filed: Aug. 29, 1989

[51] Int. Cl.⁵ .......................................... H04M 1/64
[52] U.S. Cl. ........................................ 379/76; 379/74; 379/88; 379/142
[58] Field of Search .................... 379/67, 70, 74–76, 379/84, 88, 89, 127, 142, 245–247

[56] References Cited

U.S. PATENT DOCUMENTS

| | | | |
|---|---|---|---|
| 4,266,098 | 5/1981 | Novak | 379/77 |
| 4,327,251 | 4/1982 | Fomenko et al. | 379/76 X |
| 4,518,827 | 5/1985 | Sagara | 379/88 |
| 4,850,007 | 7/1989 | Marino et al. | 379/84 X |
| 4,901,341 | 2/1990 | Carter et al. | 379/67 |

Primary Examiner—Stuart S. Levy
Assistant Examiner—James E. Tomassini
Attorney, Agent, or Firm—Burns, Doane, Swecker & Mathis

[57] ABSTRACT

According to the present invention, a telephone answering machine stores a plurality of messages and establishes a correspondence between those messages and a plurality of phone numbers. The phone number of a caller is identified and one of the plurality of messages selected for playback based on the identified phone number and the established correspondence. In a preferred embodiment, the answering machine is microprocessor-based and the correspondence of telephone numbers to messages is stored in a memory table. Messages may be stored either on magnetic media or in semiconductor memory using a signal compression/-decompression module where economy dictates in order to reduce the size of the semiconductor memory. Microprocessor control allows economical realization of a full-featured machine.

22 Claims, 11 Drawing Sheets

FIG. 1

SYSTEM BLOCK DIAGRAM

FIG. 2

TAPE BASED RANDOM ACCESS RECORDING DEVICE

FIG. 3

TAPE LAYOUT

FIG. 4

ELECTRONIC RANDOM ACCESS RECORDING DEVICE

MULTIPLE MESSAGE ANSWERING MACHINE KEYED TO THE INCOMING PHONE NUMBER

BACKGROUND OF THE INVENTION

The present invention relates to telephone answering machines and more particularly to a multiple message answering machine capable of providing a preselected one of a number of responses to an incoming telephone call depending on the number of the telephone from which the call originated.

Although telephone answering machines have quickly come to be indispensable to their users, they have been received somewhat less enthusiastically by callers, who most often perceive the recorded message to be generic, dull, and unengaging. This problem is compounded by recent concerns of safety and privacy that have caused some users to delete even mention of their name from the answering message, reciting instead only the telephone number reached. Far less would the prudent user be inclined to include a genuinely sensitive piece of information in the answering message, for instance that he or she would be on vacation for an extended period or that the door key could be found under the mat, knowing that the message would be relayed to every chance caller without differentiation. The problem that messages appropriate for strangers and the general public may not be appropriate for specific callers, and the inability to leave a particular message for a particular individual or individuals, have been tolerated for want of any workable alternative, there not having been any way to ascertain the identity of or otherwise differentiate between callers.

Arrangements are known wherein one of multiple messages is triggered by a sequence of code keys pressed by the caller. Such arrangements are burdensome, however, in their requirement that the caller memorize codes, and would become particularly burdensome if such an arrangement were to find widespread use. On the other hand, simple codes -like the last four digits of the caller's phone number- would permit individuals to easily obtain messages intended for others. Furthermore, such an arrangement tends to be fairly static, since a caller must either receive the message designated by his or her assigned code or have a change of code communicated to him or her by the user.

Telephone companies have now begun to offer a service whereby for a monthly fee subscribers can have the phone number of the incoming call electronically transmitted to their telephone. Devices are currently available that will display the incoming phone numbers as exemplified in U.S. Pat. No. 4,242,539.

SUMMARY OF THE INVENTION

The present invention uses this same telephone company service as a means by which the telephone numbers of incoming calls will trigger different answering machine messages.

According to the present invention, a telephone answering machine stores a plurality of messages and establishes a correspondence between those messages and a plurality of phone numbers. The phone number of a caller is identified and one of the plurality of messages is selected for playback based on the identified phone number and the established correspondence. In a preferred embodiment, the answering machine is microprocessorbased and the correspondence of telephone numbers to messages is stored in a memory table. Messages may be stored either on magnetic media or in semiconductor memory using a signal compression/decompression module where economy dictates in order to reduce the size of the semiconductor memory. Microprocessor control allows economical realization of a full-featured machine.

These and other features are realized through provision of a means for storing a plurality of messages, means for establishing a correspondence between a plurality of telephone numbers and the plurality of messages, automatic number identification means for identifying a caller's telephone number, and selecting means responsive to the automatic number identification means and the means for establishing a correspondence for selecting one of the plurality of messages for playback.

The invention also resides in a method of providing an answering machine with multiple messages keyed to an incoming phone number, comprising the steps of:

(a) storing a plurality of messages;

(b) establishing a correspondence between a plurality of phone numbers and the plurality of messages;

(c) identifying the phone number of a caller; and (d) selecting one of the plurality of messages for playback based on the phone number and the correspondence.

BRIEF DESCRIPTION OF THE DRAWINGS

FIG. 8, including FIGS. 8a-8j, is a group of flowcharts illustrating the different user-selectable functions implemented by the microprocessor controller.

DETAILED DESCRIPTION OF THE PREFERRED EMBODIMENTS

Figure 1:
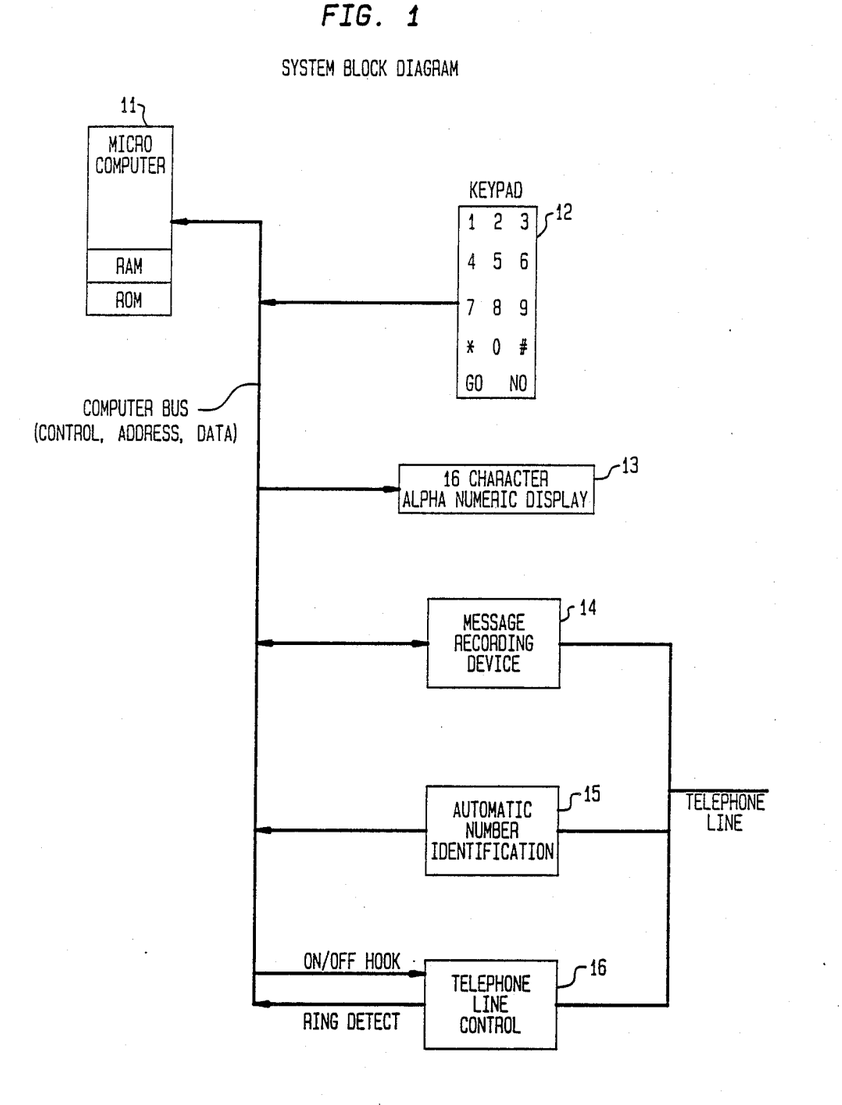
FIG. 1 is a system block diagram of the present invention.

Referring to FIG. 1, the multiple message answering machine of the present invention includes a microcomputer 11 connected to each of the remaining devices of the answering machine by a computer bus including control, address and data portions. The microcomputer 11 may be a commercially available 8-bit microcomputer consisting of a processor, program ROM and storage ROM. The program ROM is used to hold the instructions for the microcomputer used to realize a number of user-selectable functions to be later detailed. The RAM holds variables needed to implement those functions as well as the entered phone numbers for each message. As will be apparent to one of ordinary skill in the art, a microprocessor with separate RAM and ROM memories could also be used.

A keypad 12 and a display 13 may both be standard microcomputer peripherals interfaced to the microcomputer 11 in a conventional manner. The keypad 12 may be a standard fourteen key keypad and the display 13 may be a sixteen character LCD display, also a standard commercial item. The essentials of the present invention do not, however, in any way depend on the specific choice of keypad and display as will be apparent to one of ordinary skill in the art.

A message recording device 14 holds both the outgoing and incoming messages and allows the computer to select any one of a number of messages to be played back. The message recording device 14 will be described in greater detail with reference to FIGS. 2 and 4.

An automatic number identification device 15 decodes coded tones that occur during ringing and that encode the phone number of the calling party. Because this information is provided during the time when the ringing signal is active, the calling party number is available to the microcomputer 11 before it answers the phone. The decoding of the calling party number tones is accomplished in accordance with published telephone company specifications and will therefore not be further described.

A telephone line control unit 16 is of a type commonly employed in the telephone arts and performs two well-established functions. First, it detects an analog ringing signal on the telephone line and notifies the microcomputer 11 that an incoming call has arrived. Second, it provides the means by which the microcomputer 11 answers by taking the answering machine "off-hook" and hangs up by placing the answering machine "on-hook".

Figure 2:
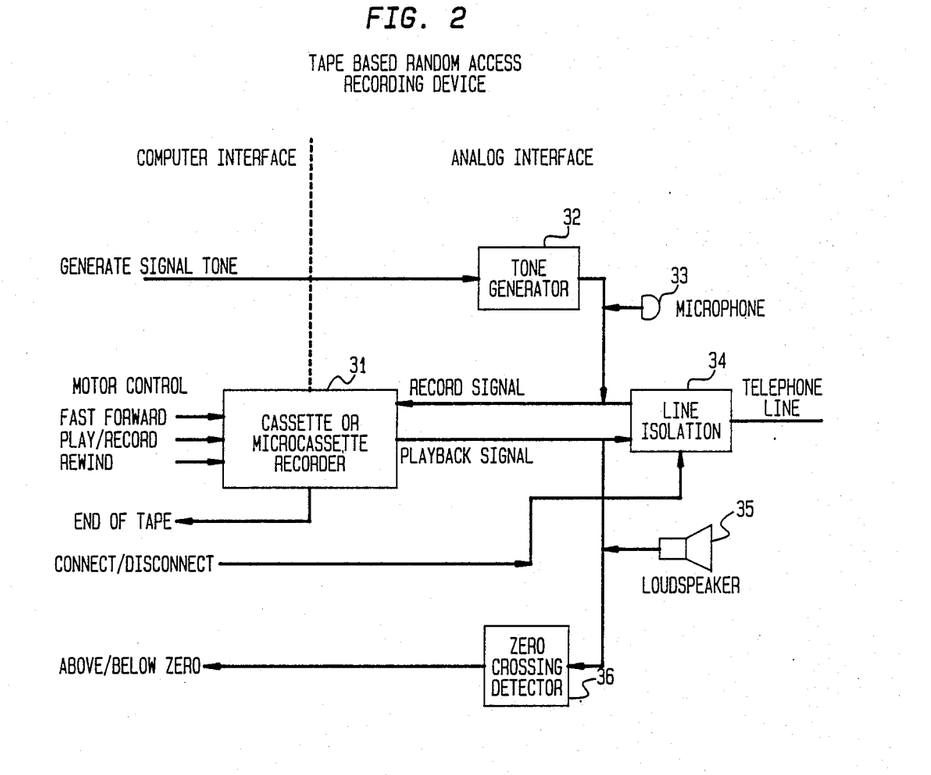
FIG. 2 is a block diagram showing in greater detail a tape-based embodiment of the message recording device of FIG. 1.

Referring to FIG. 2, showing a tape-based embodiment of the message recording device 14 of FIG. 1, a standard cassette or microcassette recorder 31 is provided with voice input and output signals, labelled RECORD SIGNAL and PLAYBACK SIGNAL, respectively, and conventional input/output control signals including FAST FORWARD, PLAY/RECORD and REWIND motor control signals and an END OF TAPE output signal Both the RECORD SIGNAL and the PLAYBACK SIGNAL are connected through a line isolation device 34 to the telephone line. The RECORD SIGNAL is further connected to a tone generator 32 controlled by the microcomputer and a microphone 33, whereas the PLAYBACK SIGNAL is connected to a zero crossing detector 36, the output of which is received by the microcomputer 11, and a loudspeaker 35.

Figure 3:
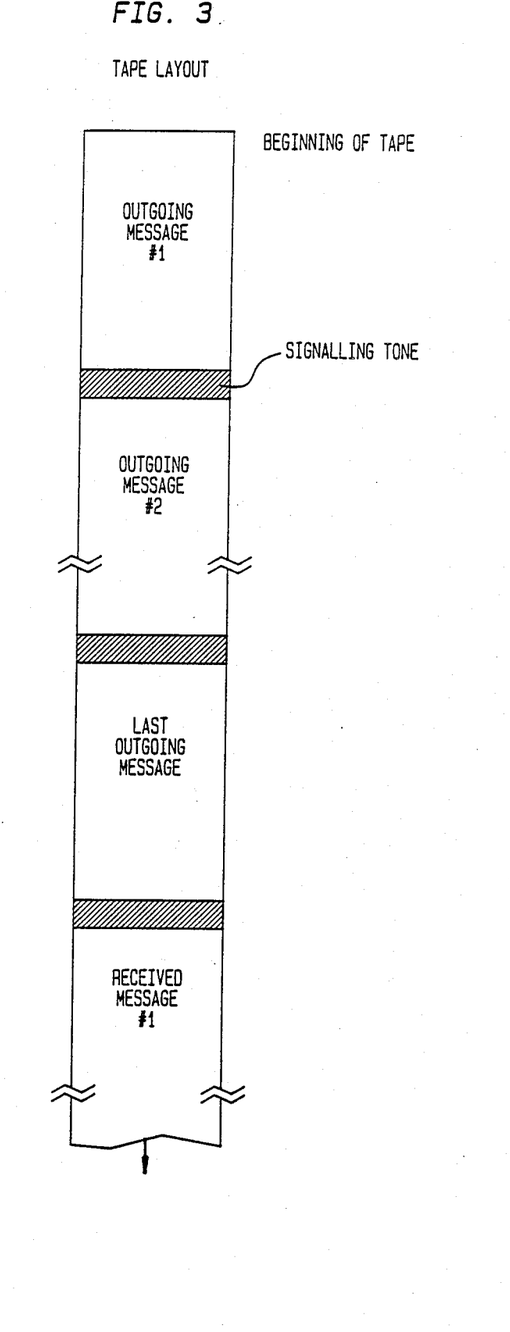
FIG. 3 is a diagram of the tape layout according to the embodiment of FIG. 2.

Before describing the operation of the tape-based random access recording device of FIG. 2 the tape layout according to which information is recorded on a standard or microcassette will be explained with reference to FIG. 3. At the beginning of the tape are recorded a number of outgoing messages, each separated by a signalling tone represented by a hatched band across the tape. Following the last outgoing message are recorded the received messages, each likewise separated by a signalling tone.

When a given outgoing message (e.g., message number "N") is to be selected for playback to the telephone line, the computer 11 executes tho following procedure. First, it is assumed that the tape is already rewound to the beginning after completion of the previous operation. The cassette recorder 31 is then put in fast forward mode with the playback head in place and the playback amplifier turned on. At the same time, the computer 11 monitors the signal from the zero crossing detector 36 (FIG. 2) looking for the high frequency pattern that indicates that a signal tone has been reached. After counting "N-1" signalling tones, the computer 11 switches the cassette player to PLAYBACK mode, activates the telephone line control unit 16 (FIG. 1) to take the receiver "off-hook" (answer the phone) and activates the telephone line isolation block 34 in FIG. 2 so that the output of the cassette player 31 is connected to the line for the caller to hear the outgoing message.

The computer 11 continues to monitor the zero crossing detector 36 until it detects the tone that marks the end of the outgoing message. It then disconnects the PLAYBACK signal from the telephone line, switches the cassette recorded 31 into FAST FORWARD, and counts signal tones until it has come to the last received message. It then switches the cassette recorder 31 into record mode and connects the telephone line back to allow recording of the incoming message. At the end of the message, it records a signal tone on the tape and then rewinds the tape to prepare for the next caller and places the answering machine back on hook (hangs up).

The process for playing back the received messages follows a similar pattern. Starting from the rewound position, the computer activates the cassette recorder 31 in FAST FORWARD mode and monitors the zero crossing detector 36 for tones. When it has counted enough tones to ensure that all outgoing messages have been passed, it switches the recorder 31 to normal PLAYBACK mode so that the operator can listen to the incoming messages through the speaker 35.

Any given outgoing message can be replaced by counting signalling tones until the beginning of the message is reached and then switching to record mode. A new message may not be longer than the old one it replaces, however, unless it replaces the last outgoing message. This restriction can be overcome by having the user re-record all outgoing messages after the new one.

It should be noted that a second cassette recorder can be used for the received messages so that the caller does not have to wait for the delay of fast forwarding past the remaining outgoing messages and previously recorded received messages.

Figure 4:
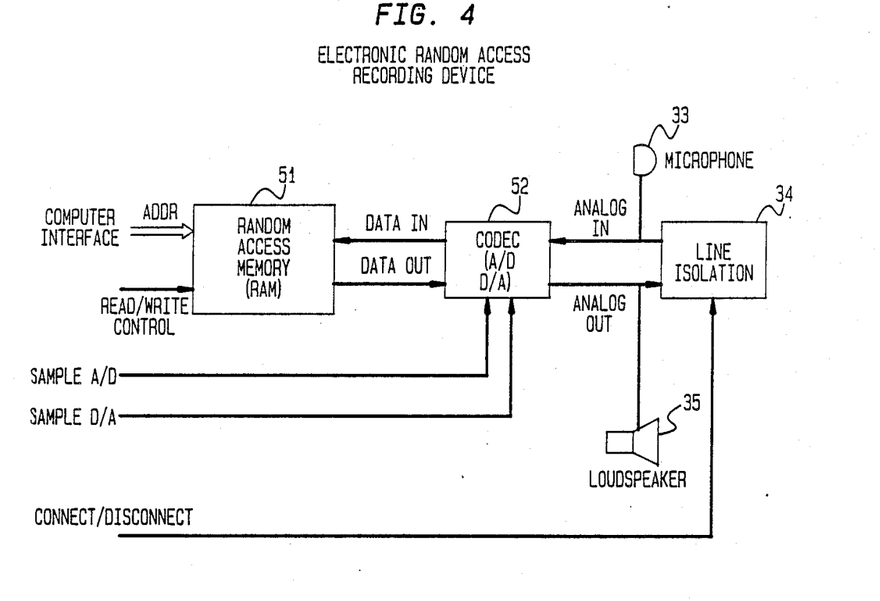
FIG. 4 is a block diagram showing in greater detail a semiconductor memory based embodiment of the message recording device of FIG. 1.

In the embodiment of FIG. 4, the message recording device used in the present invention is fully electronic without any mechanical mechanisms and will become increasingly attractive as the cost of semiconductor memory continues to drop. It should be noted, however, that it is possible to mix the magnetic tape and semiconductor memory approaches for outgoing and received messages. A machine could use tape, for example, for received messages and the electronic storage for outgoing ones.

In the electronic embodiment, a random access memory 51 replaces the cassette recorder 31 and a Codec (coder/decoder) 52 acts as a bridge between the digital domain on the side of the memory 51 and the analog domain on the side of the telephone line. A microphone 33, a line isolation block 34 and a loudspeaker 35 are identically provided as in FIG. 2. The RAM 51 is addressed by the control microcomputer 11 of FIG. 1 and the Codec 52 is likewise under control of the computer 11 so that it can be activated to either sample the incoming line and convert the analog value to a digital value to be stored in the RAM 51 or take a digital RAM value and convert it to an analog value to be presented to the telephone line.

By sampling the incoming line at a rapid rate (typically 8 Khz) wile generating a sequential series of addresses in the RAM 51, an oral message may be digitized and stored in the RAM. It may be played back by regenerating the same series of sequential addresses and activating the opposite input of the Codec. Because the RAM 51 allows for arbitrary random access, a whole series of speech segments may be stored therein and directly addressed by the controlling computer 11 to enable selection of the desired outgoing or received message.

Figure 5:
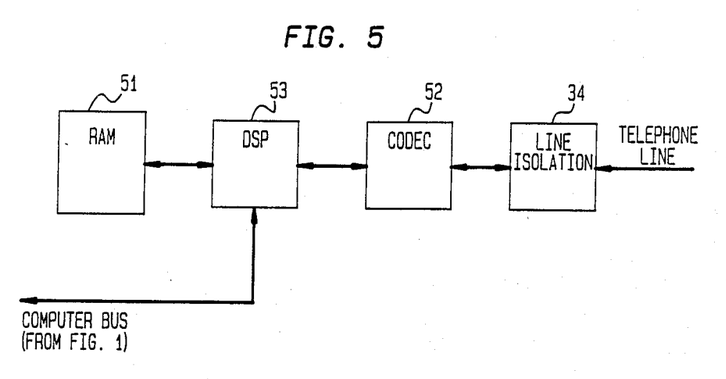
FIG. 5 is a block diagram of a further refinement of the embodiment of FIG. 4.

In order to economize on semiconductor memory, the digitized speech signals produced by the Codec 52 may be compressed according to any of a number of well-known compression algorithms before being stored away in the RAM 51 and expanded upon retrieval from the RAM to restore the speech signals to their original condition. Such compression and expansion may be performed by a suitable digital signal processor (DSP) interposed between the Codec 52 and RAM 51 as shown in FIG. 5. In this embodiment, the DSP 53 functions as a speech co-processor in cooperation with the microcomputer controller 11 of FIG. 1. Communication between the microcomputer 11 and the DSP 53 takes place over the computer bus. Digital signal processors are widely available from a number of vendors. Speech compression algorithms, described in the technical literature, allow the reduction of storage requirements for the digitized speech from approximately 8,000 bytes/second for the system of FIG. 4 to about 600–1,200 bytes/second in FIG. 5, thus considerably reducing the amount of RAM needed to hold a given amount of digitized speech.

Having described in detail the essential hardware features of the multiple message answering machine of the present invention, the operational features of the machine will presently be described. As will be appreciated from the foregoing description, the present invention allows a number of different messages to be prepared and numerous phone numbers to be assigned to each message and displays the phone number of a caller and the number of the message heard by the caller when playing back an incoming message. In addition, the user can prepare a default message for a caller whose phone number has not been pre-assigned and can easily switch the default message from one message to another.

The user can also set the answering machine so that it does not answer certain numbers. By subscribing to a Call Number Delivery Blocking service, a caller can prevent his or her number from being transmitted to the called party except by his or her authorization using a keypad command. The present invention allows the user to choose among different responses to incoming calls whose phone number has been blocked by the caller including not answering, answering with a normal default message or answering with an unique message.

Figure 6:
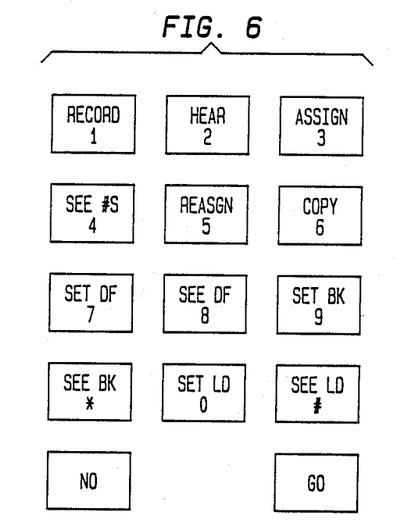
FIG. 6 is a diagram of one possible keypad layout which uses the number keys additionally to command various functions.
Figure 7:
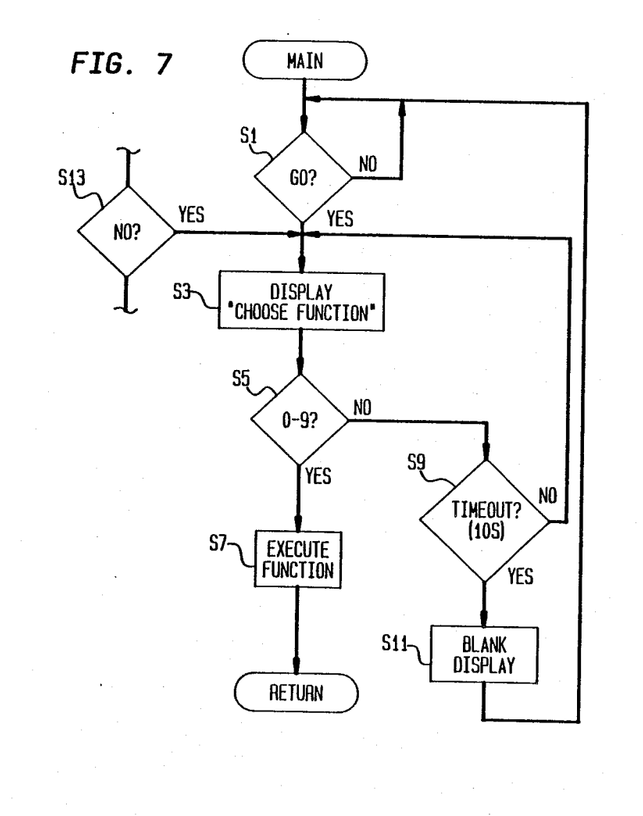
FIG. 7 is a flowchart illustrating an overall program routine of the microprocessor controller of FIG. 1.

The foregoing functions are selected by the user by means of the keypad 12 of FIG. 1, a possible layout of which is shown in FIG. 6. Briefly, the "record" and "hear" functions allow the user to record or hear a particular message whereas the "assign" function allows a phone number to be assigned to a message. The "see #s" allows the user to see all phone numbers assigned to a message. The "copy" function copies over one message with another. The "set df", "see df", "set bk", "see bk", "set LD" and "see LD" allow the user to set and have displayed a normal default message and a default message for blocked numbers, and a default message for long distance numbers, respectively. The "NO" and "GO" keys allow for convenient menu-driven operation as will presently be explained in connection with FIG. 7, showing the overall program routine of the microcomputer controller.

During periods of inactivity, the machine is in a quiescent state with the display blanked in order to conserve power. In this state, the machine monitors the keypad 12 for activation of the "GO" key, whereupon the display is activated and the words "CHOOSE FUNCTION" are displayed, prompting the user to choose one of the functions labelled in FIG. 6 by pressing the corresponding one of the keys 0–9 or the * or # keys. If a function is chosen, it is then executed and the program returns to the beginning. If a function is not chosen within a time-out period of 10 seconds, the display is once again blanked and the keypad 12 monitored for activation of the GO key. At any time during the keypad sequence, pressing the "NO" key will generate a program interrupt causing the program to return to step S3 allowing the user to abort any errors, for example in keying in a phone number.

Figure 8A:
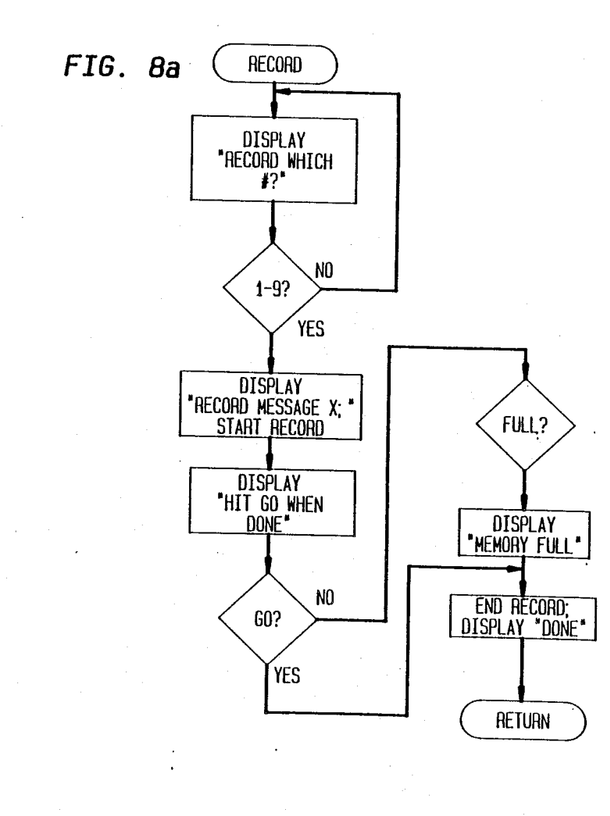

Describing the various functions in turn in conjunction with FIGS. 8a–8j, the RECORD function illustrated in FIGS. 8a is used to record a particular message. In the present embodiment, nine messages are allowed, although in other embodiments, the number of messages may be greater or fewer. On selecting the RECORD function, the prompt "RECORD WHICH #?" is displayed, after which the user selects a message number 1–9. "RECORD MESSAGE X" is then displayed where X is the message number selected and the user starts recording that message. The prompt "HIT GO WHEN DONE" is then displayed and the recording continues until the user presses GO or until memory (semiconductor or tape) runs out. If the latter occurs, "MEMORY FULL" is displayed and as much of the message as has been recorded is saved. Otherwise, "DONE" is displayed and after a brief delay (about 2 seconds, for example) the program returns to the "CHOOSE FUNCTION". A message can be erased by simply recording nothing; i.e., the GO button is simply pushed as soon as the "RECORD MESSAGE X" is displayed.

Figure 8B:
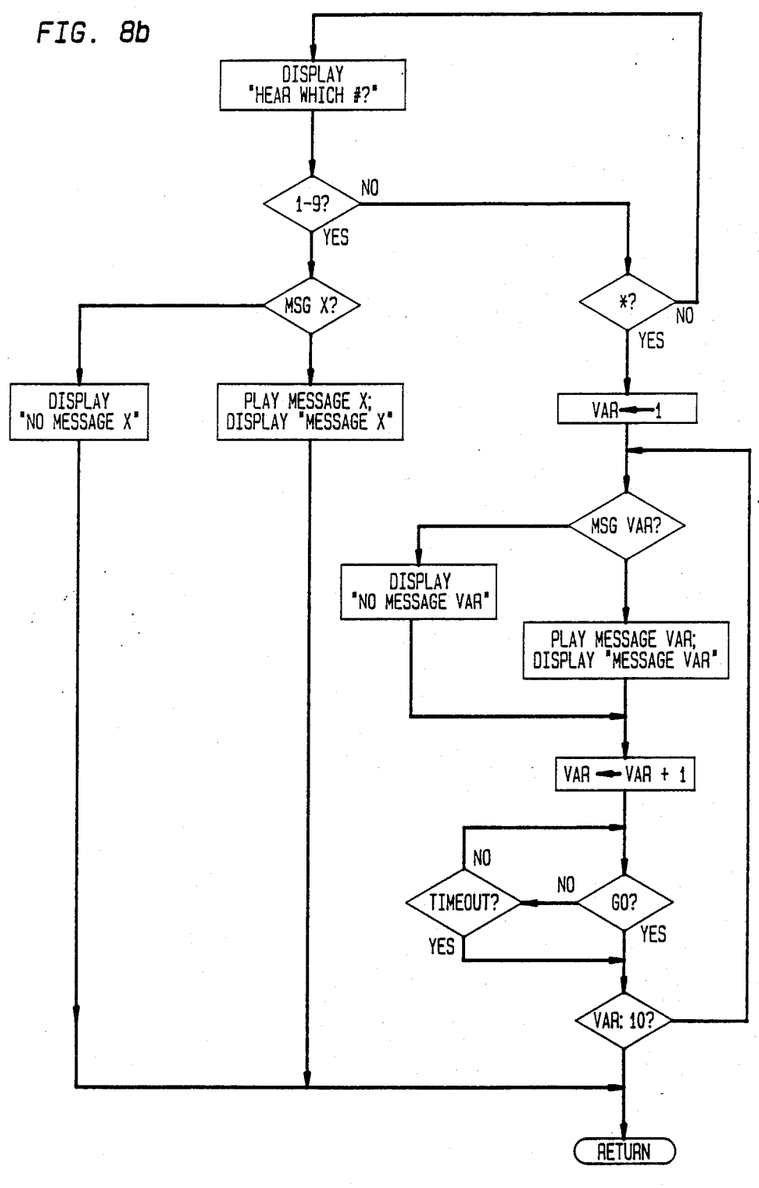

Referring to FIG. 8b, on selecting the HEAR function, the prompt "HEAR WHICH #?" is displayed. If the user keys in a number from 1-9, "MESSAGE X" is displayed where X is the number selected, and the message is played back. If there is no message X, then "NO MESSAGE X" is displayed. In either event, after a moderate delay (about 5 seconds, for example), the program returns to the "CHOOSE FUNCTION". If the user keys in the asterisk in response to "HEAR WHICH #?", the machine will step through each of the messages. "MESSAGE 1" will be displayed and recorded message 1 will be heard or else "NO MESSAGE 1" will be displayed; there will be a brief delay after which the program will move on to message 2, and so on, up to and including message 9. After a brief delay the program will then return to the "CHOOSE FUNCTION".

Figure 8C:
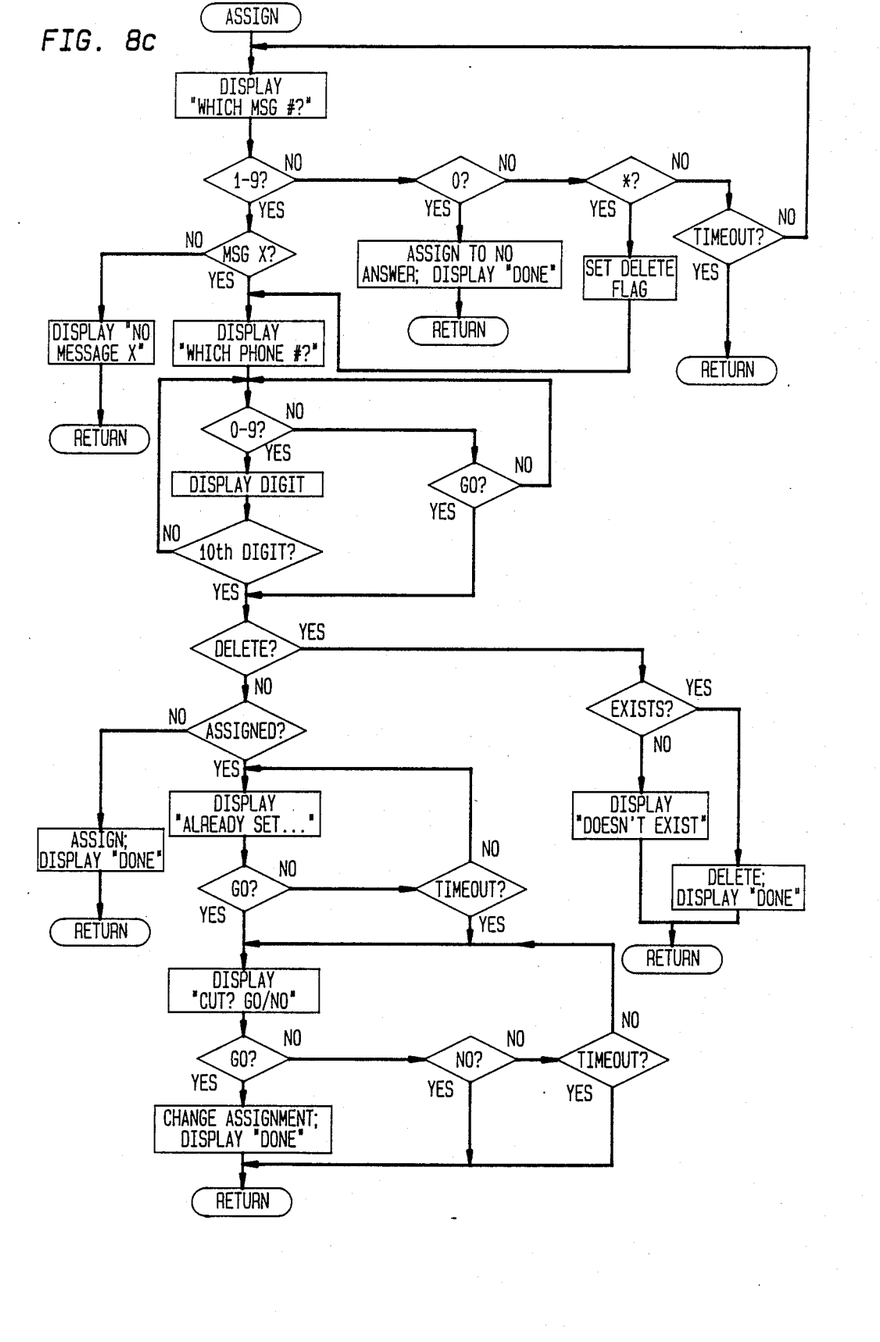

Referring to FIG. 8c, on selecting the ASSIGN function, a "WHICH MESSAGE #?" prompt will be displayed, whereupon the user then selects a number from 0–9 or the asterisk. If a message number from 1–9 is selected, the machine checks to see if a message has been recorded under the selected number. If not, "NO MESSAGE X" is displayed and after a moderate delay, the program returns to the "CHOOSE FUNCTION". If a message exists for the selected message number, a "WHICH PHONE #?" prompt is displayed, whereupon the user types in a phone number, which is displayed as it is typed, followed by pressing GO to indicate that the number is complete. The GO key is used to distinguish between 7-digit and 10-digit phone numbers; no GO is necessary after the 10th digit. The machine then checks whether the selected phone number is already assigned to some message.

If the phone number has already been assigned, "ALREADY SET..." is displayed. After a moderate delay or upon activation of the GO key, the prompt "CUT OLD #? GO/NO" is displayed. If the user presses GO, the phone number is deleted from its previous assignment and assigned to the new message number. "DONE" is then displayed, and after a brief delay the program returns to the "CHOOSE FUNCTION". If instead the user presses "NO" or does not press any key, no change is made and after a moderate delay the program returns to "CHOOSE FUNCTION".

If the phone number has not already been assigned, then the phone number is assigned to the message number selected and "DONE" is displayed followed by a return to the "CHOOSE FUNCTION" prompt after a brief delay. At some point, however, the memory available for storing phone numbers may be filled up. In this case, the display would read "MEMORY FULL", and after a moderate delay the program would return to "CHOOSE FUNCTION".

If message number 0 is selected then the phone number will be added to a list of phone numbers, calls from which will not be picked up or answered by the machine. "DONE" is displayed and after a brief delay the program returns to "CHOOSE FUNCTION".

If the asterisk is input as the message number, a delete flag is set, and when the phone number is typed in, "DOESN'T EXIST" will be displayed if a search of phone numbers does not find the number, or "DELETED FROM X", where X is the message number to which the phone number had been assigned, will be displayed and the phone number will be deleted.

Figure 8D:
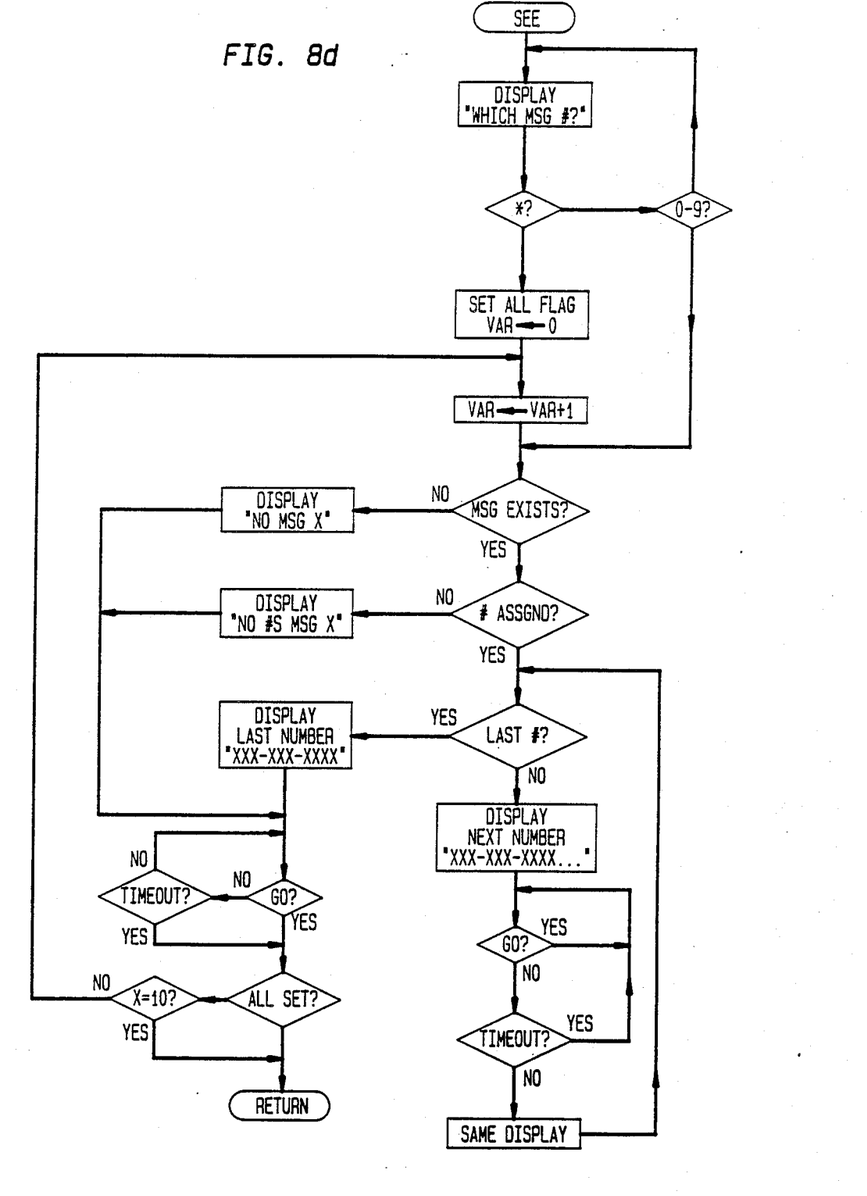

Referring to FIG. 8d, on selecting the SEE #s function, "WHICH MESSAGE #?" is displayed. The user then keys in a number from 0–9 or the asterisk. The asterisk allows the user to see the phone numbers for all messages. If a message number from 1–9 is selected, the machine will first determine whether a message exists for that message number. If not, "NO MESSAGE X" is displayed, where X is the number selected; then after a moderate delay the program will return to "CHOOSE FUNCTION". If a message exists, the machine will then check to see if any phone numbers have been assigned to this message number. If not, "NO #'S MESSAGE X" is displayed where X is the message number selected; then after a moderate delay the program will return to "CHOOSE FUNCTION". If there is at least one phone number assigned to the message, then that phone number will be displayed. If there is more than one phone number then all except the last will be displayed with trailing ellipsis (e.g., 202-555-1212...) to indicate that more is to come. The subsequent numbers can be obtained by pressing the GO key or will be displayed automatically after a moderate delay Even though the user enters phone numbers simply as a string of consecutive digits, when the machine displays the numbers it includes dashes to improve readability. Following the last number, the program will return to "CHOOSE FUNCTION" after a moderate delay.

If the user selected 0 when asked "WHICH MESSAGE #?", the machine will check to see if any phone numbers have been assigned to this "no pickup" category. Thereafter, operation proceeds in the manner described. If the user selected the asterisk when asked "WHICH MESSAGE #?" then the machine will step through all nine messages, advancing either by the press of the GO key, or after a moderate delay if the button is not pushed.

Figure 8E:
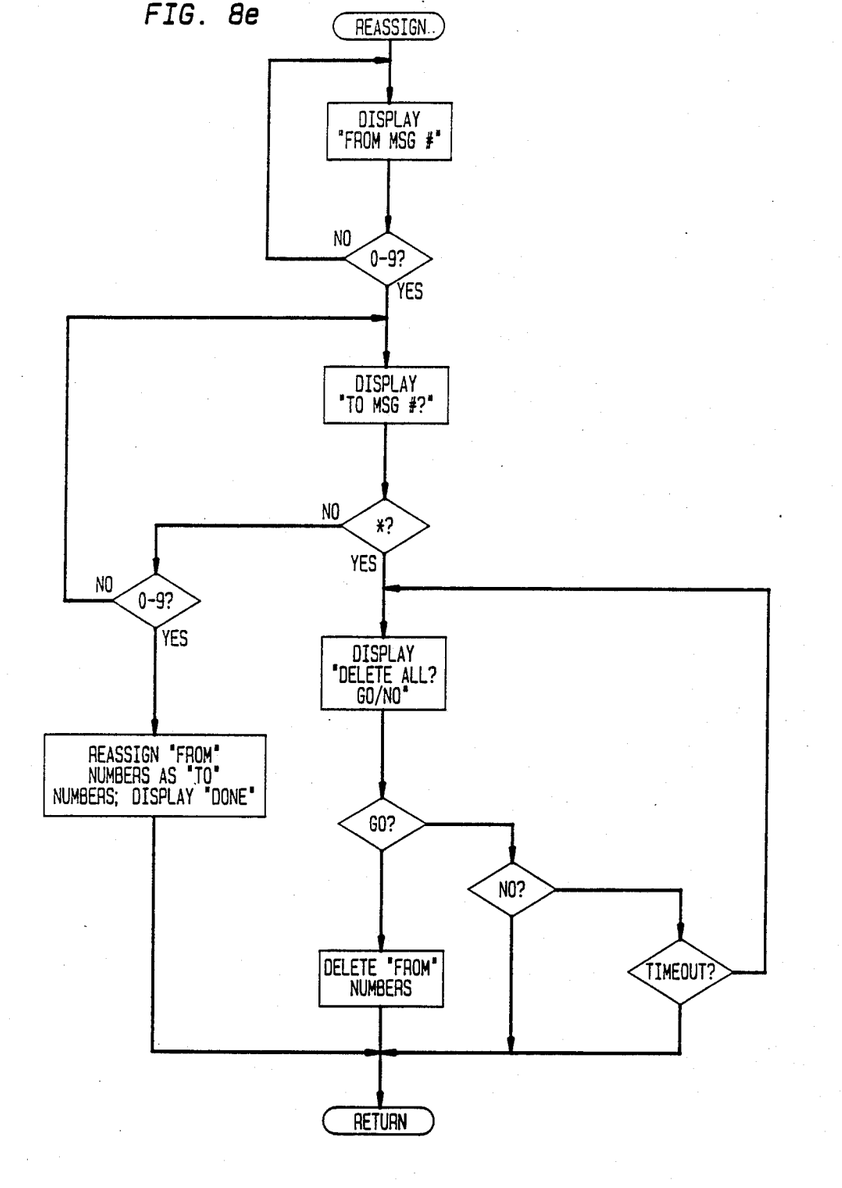

Referring to FIG. 8e, on selecting the REASSIGN function, "FROM MESSAGE #?" is displayed. The user will then type in a message number X from 0–9. "TO MESSAGE #?" is then displayed and the user will type in a number from 0–9 or the asterisk. If the user types in a number from 0–9, all the phone numbers assigned to the message number X are re-assigned to the second selected message number; "DONE" is displayed, and after a brief delay the program returns to "CHOOSE FUNCTION". If the user typed in the asterisk in response to "TO MESSAGE #?", this indicates that the user wants to delete all the phone numbers assigned to X. Because this is a drastic step, "DELETE ALL? GO/NO" is first displayed. If the user presses NO (or does nothing after a moderate delay) nothing is done and the display returns to "CHOOSE FUNCTION". If the user presses GO, then all the phone numbers assigned to message X are deleted; "DONE" is displayed, and after a brief delay the program returns to "CHOOSE FUNCTION".

Figure 8F:
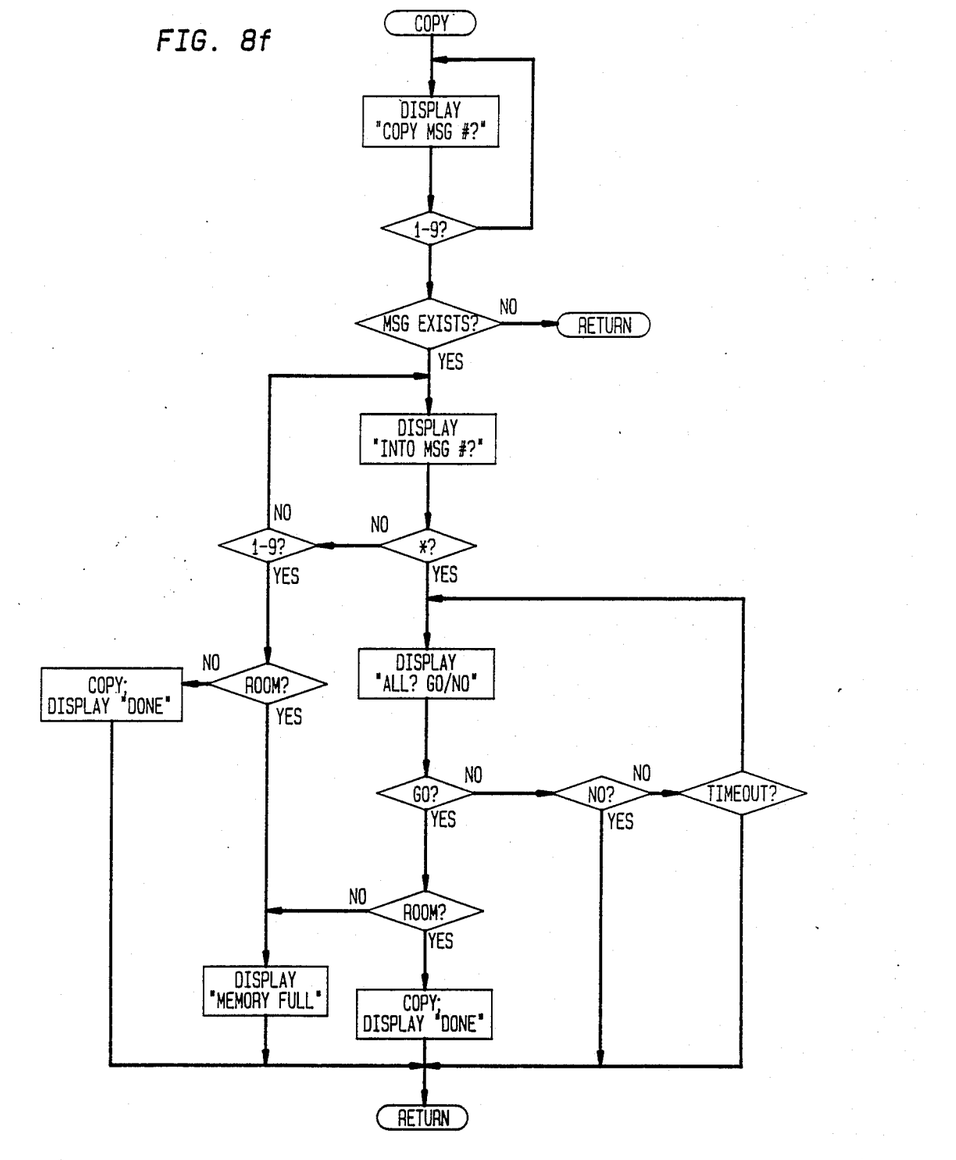
Figure 8G:
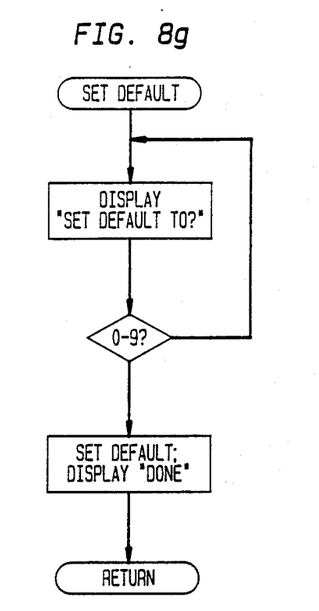
Figure 8H:
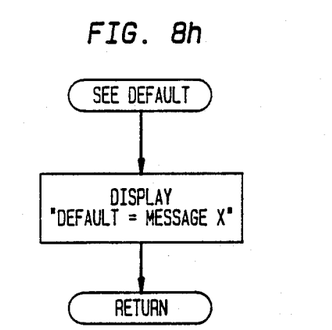

Referring to FIG. 8f, on selecting the COPY function, "COPY MESSAGE #?" is displayed. The user will then type in a message number X from 1–9. The machine will check to see whether message number X exists and if it does not "NO MESSAGE X" will be displayed and after a moderate delay the program will return to "CHOOSE FUNCTION". If message number X does exist, then "INTO MESSAGE #?" is displayed. The user will then type in a number from 1–9 or the asterisk. If the user entered a number from 1–9, then the message stored under message number X will be copied under this newly selected message number as well. The old message under the newly selected message number will be replaced. If there is not enough room in memory to copy over the message, then "MEMORY FULL" will be displayed and after a moderate delay the program will return to "CHOOSE FUNCTION"; no copying will be done.

If the user typed in the asterisk in response to "INTO MESSAGE #?", this indicates that the user wants to have all the messages 1–9 be identical to message X. Because this is a drastic step, "ALL ? GO/NO" is first displayed. If the user presses NO (or does nothing after a moderate delay), nothing is done and the display returns to "CHOOSE FUNCTION". If the user presses GO, then all the messages become copies of message number X; "DONE" is displayed and after a brief delay the program returns to "CHOOSE FUNCTION". Again, if there is insufficient room in memory to accommodate the copy operation "MEMORY FULL" is displayed and no copying will be done.

The purpose of this function can be illustrated as follows. Assume the user has phone numbers 1–15 assigned to message 1 and phone numbers 16–25 assigned to message 2. The user decides that for some period of time all 25 callers should receive message 1. The user might use the REASSIGN function to reassign phone numbers 16-25 to message 1, but then if at a later date the user wants once again to give phone numbers 16-25 a different message from the one being given to phone numbers 1-15, the user will have to rekey in each of the phone numbers 16-25. Using the COPY function on the other hand, the user can give phone numbers 16-25 the same message as 1-15 but still keep the 10 phone numbers 16-25 as a distinct group, thus allowing them to later get a new and separate message without the need for rekeying in the phone numbers.

When an incoming call arrives, the machine searches all the stored phone numbers to determine which message to play for the caller. If the number of the incoming call is not found, then the default message will be played. Initially, message 1 will be the default message but this can be changed using the SET DEFAULT function illustrated in FIG. 8g. On selecting this function, "SET DEFAULT TO?" will be displayed. The user then types in a message number from 0-9. This number specifies the new default message. If the number 0 is chosen, then there is no default message, meaning that if the phone number of an incoming call is not among those phone numbers assigned to a message, then no message will be played; that is, the phone will ring without any answering machine pick-up Similarly, if the default message corresponds to a blank message, the machine will treat this the same as if the default were 0. After the user types in a number, "DONE" is displayed, and after a moderate delay the program returns to "CHOOSE FUNCTION".

The currently selected default message may be displayed using the SEE DEFAULT function. On selecting this function, "DEFAULT NUMBER=X" is displayed where X is the number of the default message. After a moderate delay the program returns to "CHOOSE FUNCTION".

As previously described, the telephone company allows callers to have the transmission of their phone number to others blocked. The machine allows the user to assign a default message to incoming calls whose numbers are blocked. This message can be the same as the normal default message, a different message or it can be set so that no message is played. This blocked-number default is initially set to 1 but can be changed. The selected blocked-number default can also be displayed. SET BLOCKED DEFAULT and SEE BLOCKED DEFAULT functions the same as those previously discussed are provided for this purpose.

Presently, the telephone company does not transmit the phone number of a long-distance caller, but instead transmits a code indicating that the call comes from out-of-area. Even when the telephone company extends its calling number identification service to include long-distance calls, users of this machine may want to treat long-distance calls differently from local calls. Therefore, the machine allows the assigning of a default message to long-distance incoming calls, which message may, but need not, be the same as the normal default message. Additionally, the long-distance default can be set so that no message is played, that is, the answering machine does not pick up. The longdistance default is operative in response to long-distance calls whose number is not forwarded by the telephone company and longdistance calls whose number is not among the phone numbers otherwise assigned to a message. The SET LONG-DISTANCE DEFAULT and the SEE LONG-DISTANCE DEFAULT functions operate similarly to the blocked number default functions described previously.

Having described the foregoing functions, the operation of the multiple message answering machine of the present invention will be readily understood. When an incoming phone call is received, but before it is picked up, the machine examines the incoming phone number. If the incoming number is blocked by the caller, "BLOCKED NUMBER" is displayed. If the incoming call is from out-of-area and the number has not been transmitted, "LONG-DISTANCE" is displayed. Otherwise, the machine adds appropriate dashes to the number for readability and displays it.

If the incoming phone number is blocked or an unknown long-distance number, the machine will either answer after a predetermined number of rings and play the message corresponding to the default number for blocked or long-distance calls or it will neither answer nor play any message if the appropriate default has been set to 0. If the incoming phone number is not blocked or an unknown long-distance number then the machine will search through all the phone numbers stored in memory and assigned to the different messages If the phone number is found assigned to a particular message 1-9, the phone will be picked up after a pre-determined number of rings and that message will be played. If the phone number is found assigned to category 0, then the machine will neither pick up the phone nor play any message. If the phone number is not found, then the default message will be played - the normal default message for local numbers or the long-distance default for out-of-area numbers. If the default is set to 0, there will be no pick-up.

Incoming messages that are recorded on the incoming message device are coded with the phone number of the caller (or the words "BLOCKED CALL" or "LONG DISTANCE") and the number of the message the caller received. When the incoming messages are being played back by the user, the phone number and the message number are displayed (e.g., "555-1212 6"). A convenient way of realizing such operation is to generate a queue in RAM of microcomputer 11, mimicking the tape layout of recorded incoming messages and storing the phone numbers corresponding to the respective messages. When a message is played, the phone number stored in the corresponding location in the queue will be read out and displayed.

Each of these functions can be implemented by microprocessor 11 suitably programmed in a manner which will be apparent to one having ordinary skill in the art.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A telephone answering machine comprising:
 means for storing a plurality of messages;
 means for establishing a correspondence between a plurality of telephone numbers and said plurality of messages;

automatic number identification means for identifying a caller's telephone number; and selecting means responsive to said automatic number identification means and said means for establishing a correspondence for selecting one of said plurality of messages for playback.

2. The telephone answering machine of claim 1, wherein said means for storing is analog.

3. The telephone answering machine of claim 1, wherein said means for storing is digital.

4. The telephone answering machine of claim 1, wherein said means for storing comprises magnetic tape.

5. The telephone answering machine of claim 1, wherein said means for storing comprises semiconductor memory.

6. The telephone answering machine of claim 1, wherein said means for establishing a correspondence comprises a memory table.

7. The telephone answering machine of claim 1, wherein said selecting means comprises a microprocessor.

8. The telephone answering machine of claim 1, further comprising signal compression and decompression means for compressing data stored in said means for storing and decompressing data retrieved from said means for storing.

9. The telephone answering machine of claim 1, wherein said means for storing is further for storing a plurality of caller messages.

10. The telephone answering machine of claim 1, further comprising separate means for storing a plurality of caller messages.

11. The telephone answering machine of claim 1, further comprising means responsive to said automatic number identification means and said selecting means for storing along with a caller message, a caller number and an indication of said one of said plurality of messages selected for playback.

12. The telephone answering machine of claim 1, further comprising means responsive to said means for storing for playing a caller message and display means responsive to said means for playing for simultaneously displaying said caller number and said indication.

13. The telephone answering machine of claim 1, further comprising input means for causing a telephone number to be entered in said memory table.

14. A method of providing an answering machine with multiple messages keyed to an incoming phone number, comprising the steps of:
(a) storing a plurality of messages;
(b) establishing a correspondence between a plurality of phone numbers and said plurality of messages;
(c) identifying the phone number of a caller; and
(d) selecting one of said plurality of messages for playback based on said phone number and said correspondence.

15. The method of claim 14, further comprising the step of designating one of said messages as a default message for phone numbers other than those included in said correspondence.

16. The method of claim 14, further comprising the step of designating one of said messages as a default message for long-distance phone numbers other than those included in said correspondence.

17. The method of claim 14, further comprising an additional step prior to said step (a) of designating one of said messages as a default message for phone numbers that cannot be identified in said identifying step.

18. The method of claim 14, further comprising an additional step prior to said step (a) of designating one of said messages as a default message for long-distance phone numbers that cannot be identified in said identifying step or whose number is not transmitted by the telephone company.

19. The method of claim 14, comprising an additional step prior to said step (a) of designating at least one phone number to not receive any message.

20. The method of claim 14, where said correspondence may be changed arbitrarily.

21. The method of claim 14, further comprising an additional step (e) after said step (d) of recording a message from said caller, at the same time tagging said message with the caller's phone number and an indication of a one of said plurality of messages selected in said selecting step.

22. The method of claim 19, further comprising an additional step (f) after said step (e) of playing back a message from said caller, at the same time displaying said caller's phone number and said indication.

* * * * *